US012105450B2

(12) United States Patent
Miyata et al.

(10) Patent No.: US 12,105,450 B2
(45) Date of Patent: Oct. 1, 2024

(54) HEATING DEVICE AND HEATING-OBJECT UTILIZATION APPARATUS

(71) Applicant: FUJIFILM Business Innovation Corp., Tokyo (JP)

(72) Inventors: Toshiyuki Miyata, Kanagawa (JP); Toru Inoue, Kanagawa (JP); Kazuyoshi Itoh, Kanagawa (JP); Kiyoshi Koyanagi, Kanagawa (JP); Keitaro Mori, Kanagawa (JP); Sou Morizaki, Kanagawa (JP); Motoharu Nakao, Kanagawa (JP); Toko Hara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/160,863

(22) Filed: Jan. 27, 2023

(65) Prior Publication Data

US 2023/0324836 A1 Oct. 12, 2023

(30) Foreign Application Priority Data

Apr. 8, 2022 (JP) ................................ 2022-064690

(51) Int. Cl.
*G03G 15/20* (2006.01)

(52) U.S. Cl.
CPC ..... *G03G 15/2039* (2013.01); *G03G 15/2053* (2013.01)

(58) Field of Classification Search
CPC ....................... G03G 15/2039; G03G 15/2053
See application file for complete search history.

(56) References Cited

U.S. PATENT DOCUMENTS 5,300,996 A * 4/1994 Yokoyama ......... G03G 15/2053 399/334
2009/0232535 A1* 9/2009 Tsueda ............... G03G 15/2039 399/329
2011/0222933 A1* 9/2011 Maruyama ......... G03G 15/2053 399/329
2013/0108335 A1* 5/2013 Nagata ............... G03G 15/2028 399/323

FOREIGN PATENT DOCUMENTS

JP 9-49700 A 2/1997
JP 10-232576 A 9/1998
JP 2005-149952 A 6/2005
JP 2013-142834 A 7/2013

* cited by examiner

*Primary Examiner* — Sandra Brase
(74) *Attorney, Agent, or Firm* — Sughrue Mion, PLLC

(57) ABSTRACT

A heating device includes: a heater including plural heating portions that generate different amounts of heat in a width direction that crosses a transport direction in which a heating object is transported; and plural temperature equalization members that are disposed on the heater and extend in the width direction with an interval provided therebetween in the transport direction, the plural temperature equalization members equalizing a temperature of the heater in the width direction. One of the plural temperature equalization members has a length greater than or equal to a width of a maximum passing region of the heater through which the heating object passes when the heating object has a maximum width. A remaining one of the plural temperature equalization members has a length less than the length of the one of the plural temperature equalization members.

14 Claims, 9 Drawing Sheets

HEATING DEVICE AND HEATING-OBJECT UTILIZATION APPARATUS

CROSS-REFERENCE TO RELATED APPLICATIONS

This application is based on and claims priority under 35 USC 119 from Japanese Patent Application No. 2022-064690 filed Apr. 8, 2022.

BACKGROUND

(i) Technical Field

The present disclosure relates to a heating device and a heating-object utilization apparatus.

(ii) Related Art

Japanese Unexamined Patent Application Publication No. 10-232576 (see, for example, claim 1 and FIG. 1) describes a heat fixing device including a heating unit and a heat-resistant film that is slidable in contact with the heating unit. The heat fixing device permanently fixes an unfixed image on a heating material by bringing the heating material into close contact with the heat-resistant film at a side opposite to a side adjacent to the heating unit and causing the heating material to pass through a heating region together with the heat-resistant film. According to Japanese Unexamined Patent Application Publication No. 10-232576, the heat fixing device also includes a temperature-increase suppressing unit that suppresses a temperature increase at a downstream end of the heating unit and a support member supporting the heating unit in a direction in which the heating material travels.

Japanese Unexamined Patent Application Publication No. 2013-142834 (see, for example, claim 3 and FIG. 6) describes a heating unit including a substrate composed of a plate-shaped heat pipe on which a heater is printed with an insulating layer interposed therebetween and that has an outermost surface coated with another insulating layer, the heat pipe having a concave surface at least at one side thereof. The heater is printed on a surface of the heat pipe with the insulating layer interposed therebetween at a side opposite to the side of the concave surface, and the outermost surface is coated with the other insulating layer.

Japanese Unexamined Patent Application Publication No. 2005-149952 (see, for example, claim 1 and FIG. 6) describes a fixing device including a heater having linear heaters provided on a substrate; an endless belt including a metal layer and having an inner peripheral surface in contact with the heater; and a pressing member that is in contact with an outer peripheral surface of the endless belt and that forms a nip section, in which a recording material is nipped and transported, together with the heater with the endless belt interposed therebetween. The fixing device heats and fixes an image on the recording material in the nip section. In the fixing device described in Japanese Unexamined Patent Application Publication No. 2005-149952, a contact surface between the heater and the endless belt includes a contact region in which the heater is in contact with the endless belt and non-contact regions in which the heater is not in contact with the endless belt. The contact region has a width less than a width of the nip section in a rotation direction in which the endless belt rotates, and the region including the linear heaters of the heater entirely overlaps the contact region.

SUMMARY

Aspects of non-limiting embodiments of the present disclosure relate to a heating device including a heater and plural temperature equalization members arranged on the heater, the heater including plural heating portions that generate different amounts of heat in a width direction crossing a transport direction in which a heating object is transported. According to the heating device, compared to a case in which the plural temperature equalization members have lengths greater than or equal to a width of a maximum passing region of the heater, through which the heating object passes when the heating object has a maximum width, and are arranged to overlap the maximum passing region, an unnecessary temperature increase in a non-passing region, which is a portion of the maximum passing region through which the heating object does not pass in a heating process, and time required for start-up heating of the heater may be reduced.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a heating device including: a heater including a plurality of heating portions that generate different amounts of heat in a width direction that crosses a transport direction in which a heating object is transported; and a plurality of temperature equalization members that are disposed on the heater and extend in the width direction with an interval provided therebetween in the transport direction, the plurality of temperature equalization members equalizing a temperature of the heater in the width direction, wherein one of the plurality of temperature equalization members has a length greater than or equal to a width of a maximum passing region of the heater through which the heating object passes when the heating object has a maximum width, and wherein a remaining one of the plurality of temperature equalization members has a length less than the length of the one of the plurality of temperature equalization members.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will now be described with reference to the drawings.

First Exemplary Embodiment

Figure 1:
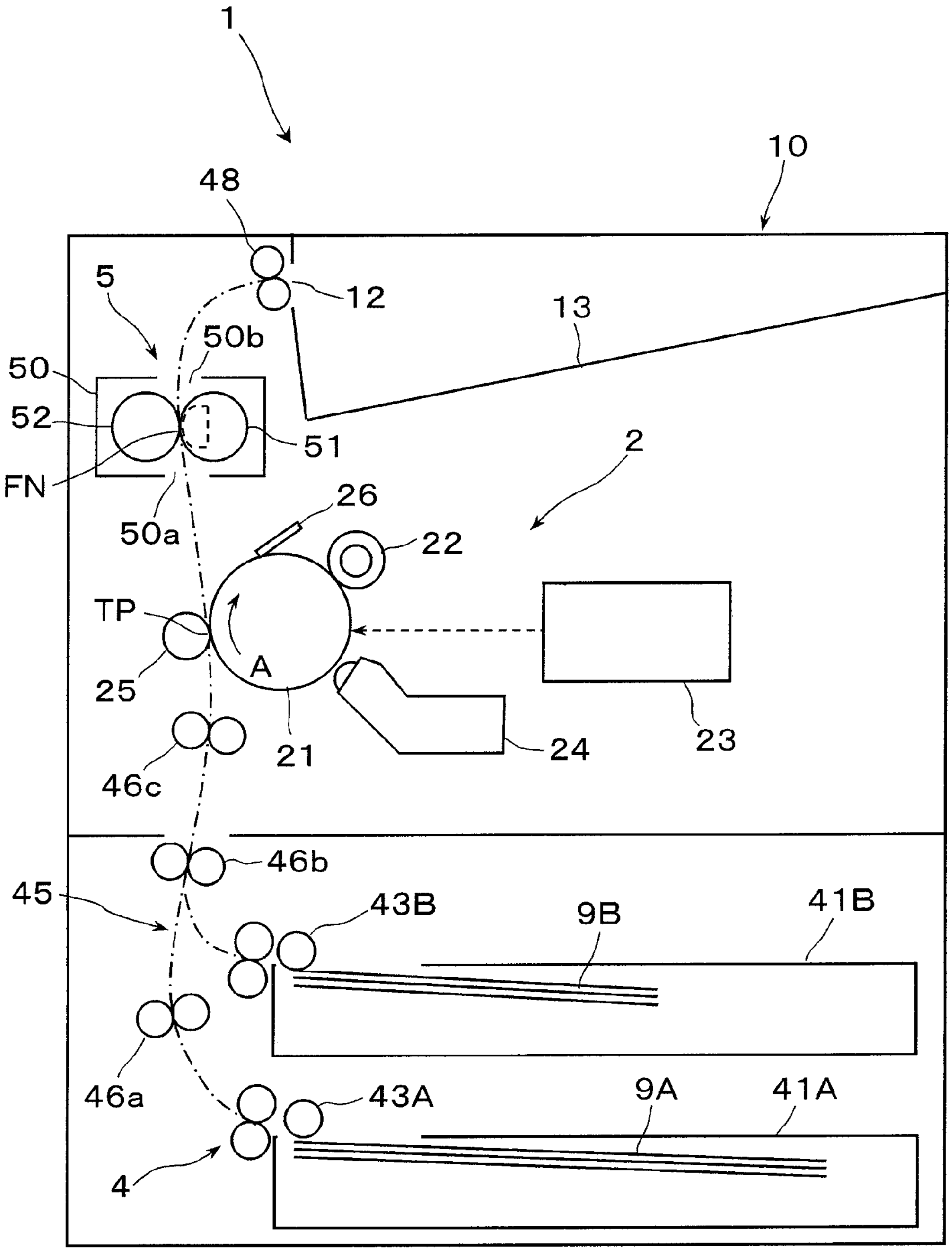
FIG. 1 is a schematic diagram of an image forming apparatus according to a first exemplary embodiment.
Figure 2:
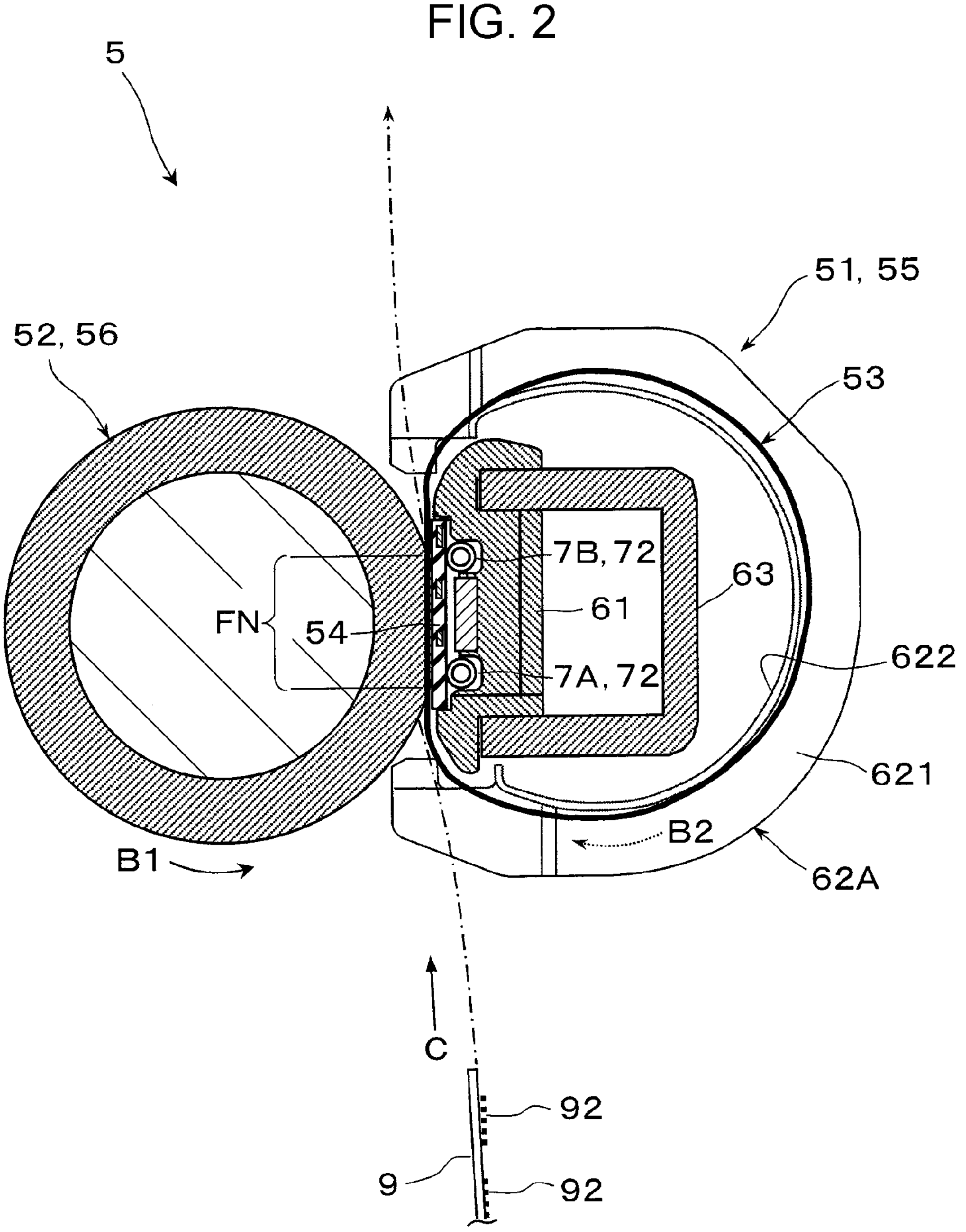
FIG. 2 is a schematic sectional view of a heating device according to the first exemplary embodiment.

FIGS. 1 and 2 illustrate an exemplary structure of a first exemplary embodiment of the present disclosure. FIG. 1 illustrates an image forming apparatus 1 according to a first exemplary embodiment, and FIG. 2 illustrates a heating device 5 according to the first exemplary embodiment.

Image Forming Apparatus

The image forming apparatus 1 is an apparatus that forms an image by forming a developer image made of developer, which is an example of powder, on a paper sheet 9, which is an example of a heating object, and then heating the paper sheet 9. The image forming apparatus 1 corresponds to an example of a heating-object utilization apparatus that utilizes a heating object.

As illustrated in FIG. 1, the image forming apparatus 1 includes a housing 10 having a predetermined external shape, and devices including an image forming device 2, a sheet feeding device 4, and a heating device 5 are disposed in the housing 10. The one-dot chain line shown in FIG. 1 represents a transport path along which the paper sheet 9 is transported in the housing 10.

The image forming device 2 is a device that forms a toner image made of toner, which serves as the developer, and transfers the toner image to the paper sheet 9. The image forming device 2 includes a photoconductor drum 21, which rotates in the direction shown by arrow A, and devices including a charging device 22, an exposure device 23, a developing device 24, a transfer device 25, and a cleaning device 26 are arranged around the photoconductor drum 21.

The photoconductor drum 21, which is an example of an image carrier, is a drum-shaped photoconductor including a photosensitive layer that serves as an image forming surface and an image carrying surface. The charging device 22 is a device that charges an outer peripheral surface (image forming surface) of the photoconductor drum 21 to a predetermined surface potential. The charging device 22 includes, for example, a roller-shaped charging member that is brought into contact with the image forming surface on the outer peripheral surface of the photoconductor drum 21 and receives a charging current.

The exposure device 23 is a device that forms an electrostatic latent image by exposing the charged outer peripheral surface of the photoconductor drum 21 to light based on image information. The exposure device 23 operates in response to an image signal generated by a predetermined process performed on the image information, which is input from an external unit, by an image processor (not illustrated) or the like. The image information is, for example, information regarding an image to be formed including texts, graphics, pictures, and patterns. The developing device 24 is a device that visualizes the electrostatic latent image formed on the outer peripheral surface of the photoconductor drum 21 into a monochrome toner image by developing the electrostatic latent image with developer (toner) of a predetermined color (for example, black).

The transfer device 25 is a device that transfers the toner image formed on the outer peripheral surface of the photoconductor drum 21 to the paper sheet 9 by an electrostatic method. The transfer device 25 includes a transfer member that is roller-shaped, for example, that comes into contact with the outer peripheral surface of the photoconductor drum 21, and that receives a transfer current. The cleaning device 26 is a device that cleans the outer peripheral surface of the photoconductor drum 21 by removing unnecessary substances, such as unnecessary toner and paper dust, adhering to the outer peripheral surface of the photoconductor drum 21.

In the image forming device 2, a location at which the photoconductor drum 21 and the transfer device 25 face each other serves as a transfer position TP at which transferring of the toner image is performed.

The sheet feeding device 4 is a device that contains paper sheets 9 to be supplied to the transfer position TP in the image forming device 2, and feeds the paper sheets 9. The sheet feeding device 4 includes one or more containers 41 that contain the paper sheets 9 and one or more delivery devices 43, for example, that deliver the paper sheets 9.

Each container 41 is a container member including a stacking plate (not illustrated) on which plural paper sheets 9 are stacked in a predetermined orientation. Each delivery device 43 is a device that delivers the paper sheets 9 stacked on the stacking plate of the corresponding container 41 one at a time by using, for example, plural rollers. According to the first exemplary embodiment, the sheet feeding device 4 includes, for example, two containers 41A and 41B capable of respectively containing paper sheets 9A and 9B having different widths in a transport process; and two delivery devices 43A and 43B that respectively deliver the paper sheets 9A and 9B contained in the containers 41A and 41B.

The sheet feeding device 4 is connected to the transfer position TP in the image forming device 2 by a sheet-feeding transport path 45, which is an example of a transport unit. The sheet-feeding transport path 45 is a sheet transport path along which the paper sheet 9 (9A or 9B) fed by the sheet feeding device 4 is transported and supplied to the transfer position TP, and includes plural pairs of transport rollers 46*a* and 46*b* between which the paper sheet 9 is nipped and transported and plural guide members (not illustrated) arranged to provide a transport space for the paper sheet 9 and guide the paper sheet 9.

The paper sheet 9 may be any sheet-shaped recording medium that is transportable in the housing 10 and to which a toner image may be transferred and fixed by applying heat, and the material and shape thereof, for example, are not particularly limited.

The heating device 5 is a device that performs a process of applying heat and pressure to fix the unfixed toner image that has been transferred to the paper sheet 9 at the transfer position TP in the image forming device 2 to the paper sheet 9. The heating device 5 includes a housing 50 having an inlet 50*a* and an outlet 50*b* for the paper sheet 9, and devices including a heating rotating body 51 and a pressing rotating body 52 are disposed in the housing 50.

As illustrated in FIGS. 1 and 2, the heating device 5 is structured such that the heating rotating body 51 and the pressing rotating body 52 rotate in contact with each other in a contact section FN, and heat and pressure are applied to the paper sheet 9, for example, that passes through the contact section FN.

The heating device 5 will be described in detail below.

An example of the manner in which the image forming apparatus 1 forms an image will now be described.

When a controller (not illustrated) of the image forming apparatus 1 receives a command for an image forming operation, the image forming device 2 performs predetermined operations including a charging operation, an exposure operation, a developing operation, a transfer operation, and a cleaning operation, and the sheet feeding device 4 performs a sheet feeding operation in which one of the paper sheets 9 (9A or 9B) is fed and transported to the transfer position TP along the sheet-feeding transport path 45.

Thus, a toner image corresponding to the image information is formed on the photoconductor drum 21, and is transferred to the paper sheet 9 that has been transported from the sheet feeding device 4 and supplied to the transfer position TP. The paper sheet 9 to which the toner image has been transferred is nipped between the photoconductor drum 21 and the transfer device 25, and is removed from the photoconductor drum 21 to be transported toward the heating device 5.

Next, in the image forming apparatus 1, as illustrated in FIG. 2, the heating device 5 performs a fixing operation of causing the paper sheet 9 to which a toner image 92 has been transferred to enter and pass through the contact section FN between the heating rotating body 51 and the pressing rotating body 52 while applying heat and pressure to the paper sheet 9. Accordingly, the unfixed toner image 92 is fixed to the paper sheet 9 by being heated and melted under pressure. In this process, the heating rotating body 51 and the pressing rotating body 52 serve as a transport unit that transports the paper sheet 9.

After the fixing operation, the paper sheet 9 nipped between the heating rotating body 51 and the pressing rotating body 52 of the heating device 5 is output from the housing 50, and is transported to a sheet outlet 12 along a sheet-outputting transport path. Thus, the paper sheet 9 is finally transported to an output sheet receiver 13 provided on a portion of the housing 10 by output rollers 48.

Thus, a basic image forming operation performed by the image forming apparatus 1 to form a monochrome image on one side of one paper sheet 9 is completed.

Heating Device

The heating device 5 will now be described in detail.

Figure 3:
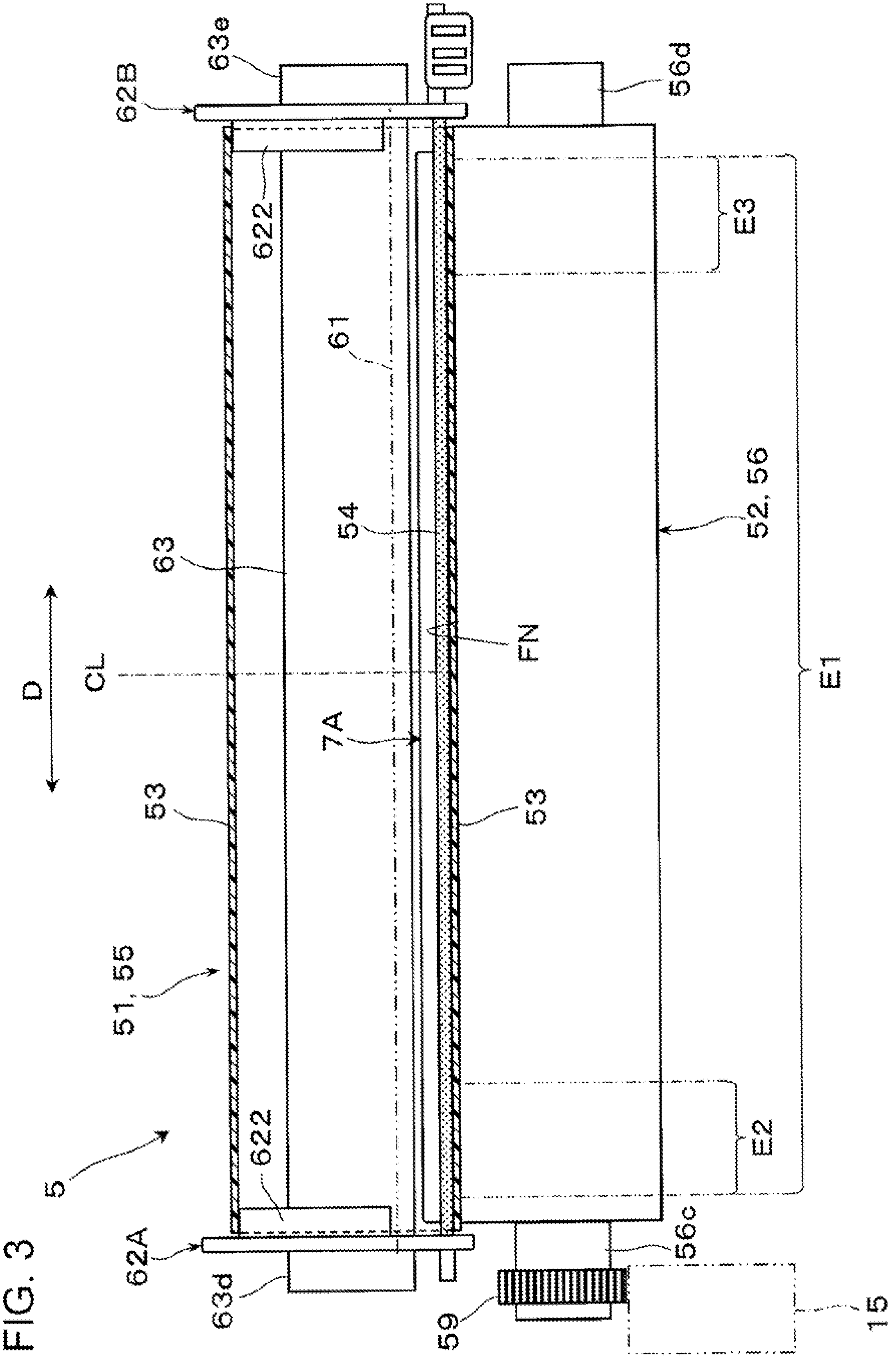
FIG. 3 is a schematic partially sectioned view of a relevant part of the heating device illustrated in FIG. 2.

As illustrated in, for example, FIGS. 2 and 3, the heating device 5 includes a belt-nip heating unit 55 as the above-described heating rotating body 51 and a roller-shaped pressing roller 56 as the above-described pressing rotating body 52.

The heating unit 55 heats the paper sheet 9 in the contact section FN (example of a contact portion) extending in a width direction D (see, for example, FIG. 3) crossing a transport direction C in which the paper sheet 9 is transported.

The heating unit 55 is configured as a unit including a heating belt 53 that is rotatable; a heater 54 that presses the heating belt 53 against the pressing rotating body 52 at an inner peripheral surface of the heating belt 53 to form the contact section (nip) FN and that generates heat to be applied; and plural temperature equalization members 7 that are arranged on the heater 54 to equalize the temperature of the heater 54 in the width direction D.

Figure 4A:
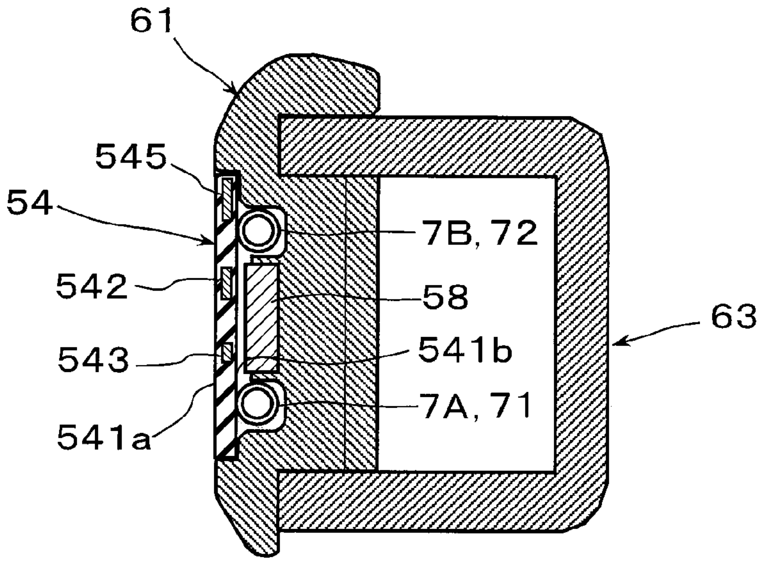
FIG. 4A is a schematic sectional view of a part of a heating unit included in the heating device illustrated in FIG. 2.
Figure 4B:
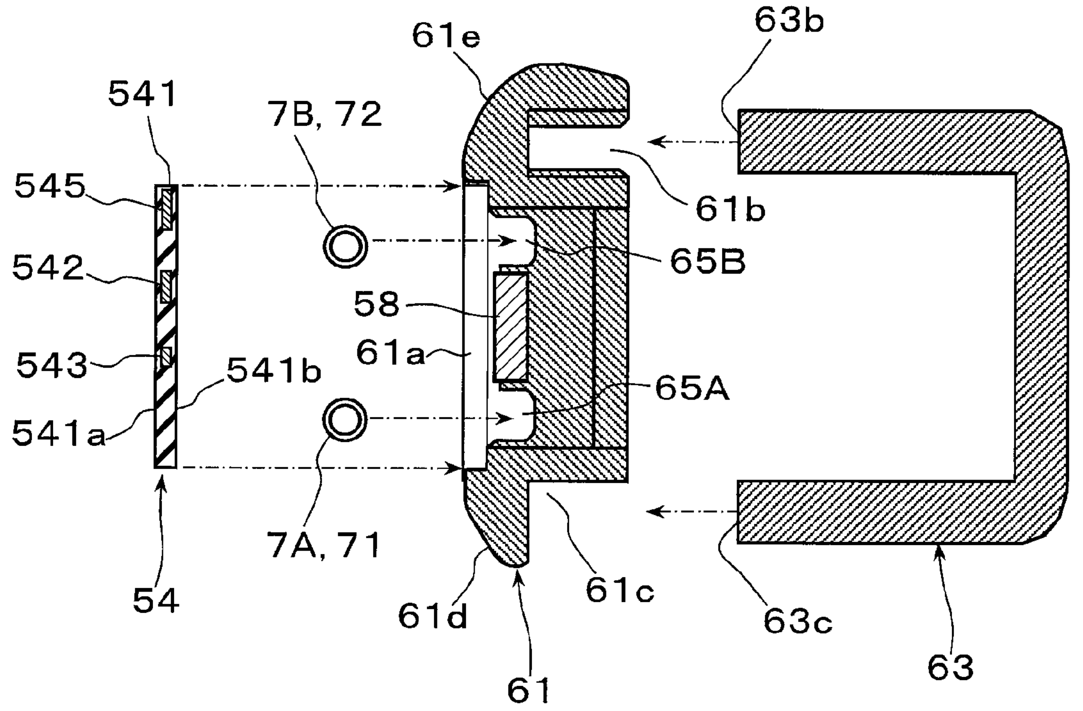
FIG. 4B is an exploded view of the heating unit illustrated in FIG. 4A.

As illustrated in FIGS. 3, 4A, and 4B, the heating unit 55 is structured such that the heater 54 is held in contact with the inner peripheral surface of the heating belt 53 by a contact holder 61 and that the heating belt 53 is rotatably held by a portion of the contact holder 61 and left and right end holders 62A and 62B illustrated in FIG. 3.

The heating unit 55 includes a support 63 that supports the contact holder 61 and the left and right end holders 62A and 62B.

The heating belt 53 is a thermally conductive endless belt that is flexible and heat-resistant. The heating belt 53 is composed of a belt obtained by forming, for example, a synthetic resin material, such as polyimide or polyamide, into a cylindrical original shape.

Figure 5:
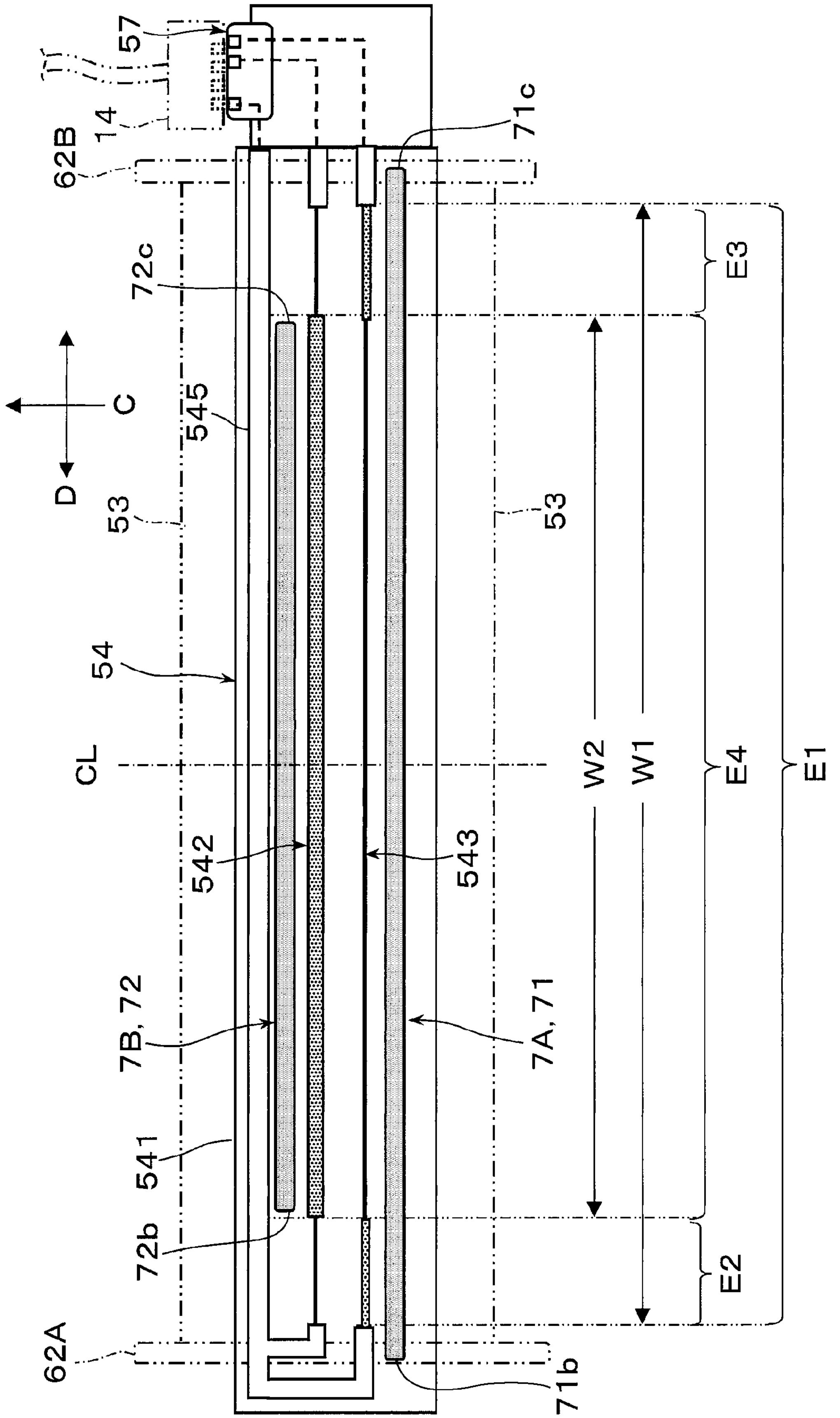
FIG. 5 is a schematic diagram illustrating a part of the heating unit.

As illustrated in FIG. 5, the heater 54 has a maximum passing region E1 that allows passage and heating of the paper sheet 9 whose width (width dimension) W in the width direction D crossing the transport direction C is a maximum width W1 of the paper sheet 9 usable in the image forming apparatus 1.

As illustrated in FIGS. 4A to 6B, the heater 54 includes a substrate 541, plural heating portions 542 and 543 (two heating portions in this example) provided in the substrate 541, and a wiring portion 545 provided in the substrate 541.

The substrate 541 is a rectangular plate-shaped member having a length greater than a width of the maximum passing region E1. The substrate 541 is made of an electrically insulating material, and is composed of, for example, a ceramic substrate. A surface (one surface) 541*a* of the substrate 541 that is in contact with the inner peripheral surface of the heating belt 53 is covered with a covering layer after the heating portions 542 and 543 are provided.

Figure 6A:
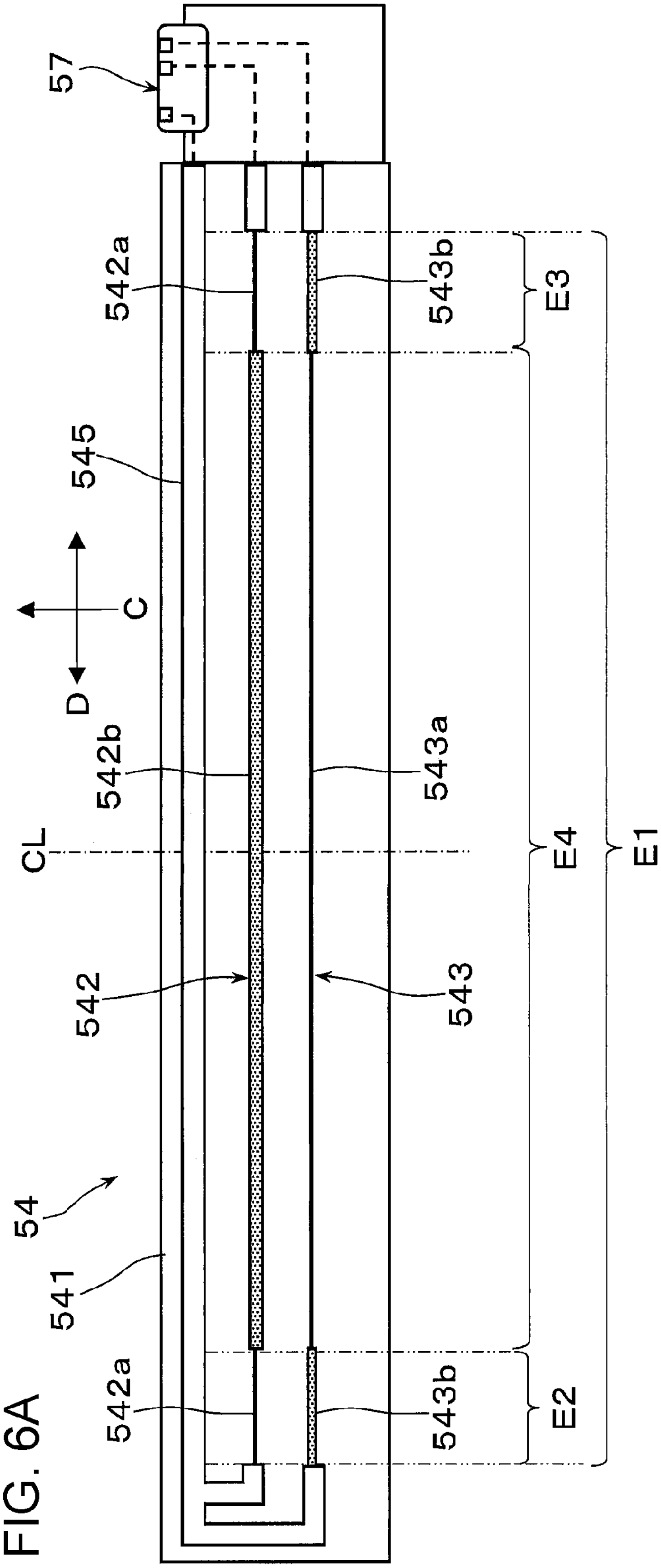
FIG. 6A is a schematic diagram of a heater included in the heating unit.
Figure 6B:
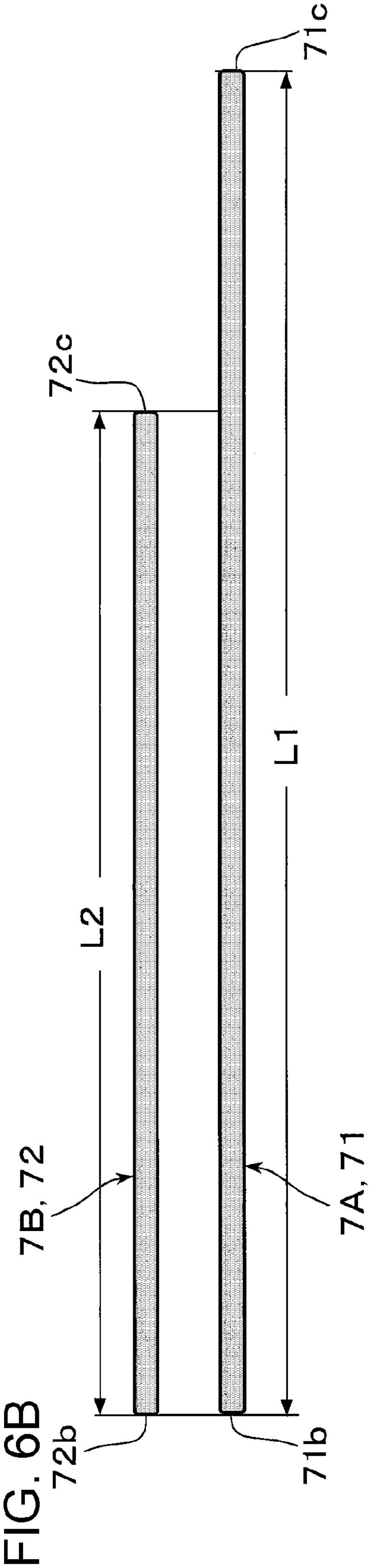
FIG. 6B is a schematic diagram illustrating heat pipes as examples of temperature equalization members.

Referring to FIG. 6A, the heating portions 542 and 543 are resistance heating wires that extend straight along the one surface 541*a* of the substrate 541 in a longitudinal direction thereof (direction along the width direction D of the paper sheet 9), and are disposed substantially parallel to each other with an interval therebetween in the transport direction C of the paper sheet 9.

The heating portions 542 and 543 are structured to generate different amounts of heat in the width direction D of the paper sheet 9, which is the longitudinal direction of the substrate 541.

The heating portion 542 serves as a first heating portion in which sections 542*a* thereof corresponding to non-passing regions E2 and E3, which are portions of the maximum passing region E1 through which the paper sheet 9 does not pass, generate the largest amount of heat.

The heating device 5 employs a center reference transport system (center registration system), and therefore the non-passing regions E2 and E3 of the heating device 5 are provided at both ends of the maximum passing region E1 in the width direction D.

According to the center reference transport system, the paper sheet 9 is guided and transported such that the central position thereof in the width direction D substantially coincides with a reference position (central reference line) CL at the center of the maximum passing region E1 of the paper sheet 9 in the above-described contact section FN of the heating device 5 in the width direction D.

The heating portion 543 serves as a second heating portion in which a section 543*a* thereof corresponding to a region (normal passing region) E4, which is a portion of the maximum passing region E1 excluding the non-passing regions E2 and E3, generates the largest amount of heat.

The region E4 excluding the non-passing regions E2 and E3 is a region corresponding to a width W2 that is less than the maximum width W1 and that is a width of the paper sheet 9 expected to be used often. Accordingly, in the image forming apparatus 1 or the heating device 5, the paper sheet 9 that is transported may have a width less than the width W2.

The sections 542*a* and 543*a* of the heating portions 542 and 543 that generate relatively large amounts of heat are formed by increasing the electrical resistance thereof by, for example, reducing at least one or both of the width and thickness of the resistance heating wires in the sections 542*a* and 543*a* compared to those in other sections (sections 542*b* and 543*b* that generate small amounts of heat).

The first heating portion 542 according to the first exemplary embodiment is structured such that the amount of heat generated in the section 542*b* corresponding to the region E4 excluding the non-passing regions E2 and E3 is less than or equal to about one-half of the amount of heat generated in the sections 542*a* corresponding to the non-passing regions E2 and E3.

The second heating portion 543 according to the first exemplary embodiment is structured such that the amount of heat generated in the sections 543*b* corresponding to the non-passing regions E2 and E3 is less than or equal to about one-half of the amount of heat generated in the section 543*a* corresponding to the region E4 excluding the non-passing regions E2 and E3.

The wiring portion 545 is a portion used as a ground line when power is supplied.

As illustrated in, for example, FIG. 6A, the heating portions 542 and 543 are connected to respective power-supply terminals on a power-supply connector 57, and receive power through the power-supply connector 57. The heating portions 542 and 543 are connected to the wiring portion 545 at ends thereof opposite to the ends adjacent to the power-supply connector 57. The wiring portion 545 is connected to a dedicated terminal on the power-supply connector 57.

When the paper sheet 9 to be heated has the maximum width W1, the heater 54 causes both the first heating portion 542 and the second heating portion 543 to generate heat. When the paper sheet 9 to be heated has a width less than or equal to the width W2 corresponding to the region E4 excluding the non-passing regions E2 and E3, the heater 54 causes only the second heating portion 543 to generate heat.

When the heater 54 generates heat, the temperature thereof is measured by a temperature sensor 58 disposed in contact with a back surface 541*b* of the substrate 541 illustrated in FIGS. 4A and 4B at an appropriate location. The heater 54 is provided with a heating controller (not illustrated) that controls the on/off states of the operations of the heating portions 542 and 543 based on the information obtained by the temperature sensor 58 and fed back to the heating controller.

As illustrated in, for example, FIG. 5, the power-supply connector 57 is disposed on an end portion of the substrate 541 that extends outward beyond, for example, the right end holder 62B illustrated in FIG. 5. The power-supply connector 57 is capable of being connected to and receiving power from a power-supply source connector 14 disposed to extend from a power supply unit (not illustrated) of the image forming apparatus 1 or the heating device 5.

As illustrated in, for example, FIGS. 4A and 4B, the contact holder 61 is a plate-shaped member that extends in one direction and that has a receiving recess 61*a* for receiving and holding the heater 54 in one surface of the contact holder 61 that is brought into contact with the inner peripheral surface of the heating belt 53.

The contact holder 61 has an attachment groove 61*b* and an attachment contact portion 61*c* used to attach the contact holder 61 to a support 63 in a surface at a side opposite to the side of the one surface.

The contact holder 61 includes an entrance guide portion 61*d* formed along one long edge of the one surface in which the receiving recess 61*a* is provided, the entrance guide portion 61*d* having a bent surface that guides the heating belt 53 to cause the heating belt 53 to enter the contact section FN. The contact holder 61 also includes an exit guide portion 61*e* formed along the other long edge of the one surface, the exit guide portion 61*e* having a curved surface that guides the heating belt 53 in a direction in which the heating belt 53 exits the contact section FN.

As illustrated in FIGS. 2 and 3, each of the left and right end holders 62A and 62B is a member including a body 621 having the shape of a disc from which a portion facing the pressing roller 56 is cut off and a guiding-and-holding portion 622 provided on an inner surface of the body 621. The guiding-and-holding portions 622, which have a curved shape, guide and hold both end portions of the heating belt 53 in the width direction in a rotatable manner at the inner peripheral surface of the heating belt 53. The left and right end holders 62A and 62B have attachment recesses (not illustrated), to which end portions of the support 63 are fitted and attached, in inner surfaces of the guiding-and-holding portions 622 on the bodies 621.

As illustrated in, for example, FIG. 3, the support 63 is a member having a length greater than that of the heater 54 in the longitudinal direction. As illustrated in, for example, FIG. 4A, the support 63 may be, for example, a member formed by bending long edge portions of a flat plate elongated in one direction at right angles in the same direction into an angular U-shape in cross-section.

When the support 63 is attached to the contact holder 61, as illustrated in, for example, FIG. 4B, the support 63 is retained such that one bent end portion 63*b* thereof is fitted to the attachment groove 61*b* in the contact holder 61 and that the other bent end portion 63*c* thereof is in contact with the attachment contact portion 61*c* of the contact holder 61. Thus, the support 63 supports the contact holder 61 by holding a portion of the contact holder 61 along the longitudinal direction.

The temperature equalization members 7 are disposed in contact with a surface (back surface) 541*b* of the substrate 541 of the heater 54 at a side opposite to the side of the surface 541*a* that is in contact with the heating belt 53.

As illustrated in, for example, FIGS. 4A to 6B, a temperature equalization member 7A, which is one of the temperature equalization members 7, has a length L1 greater than or equal to the width of the maximum passing region E1 of the heater 54 through which the paper sheet 9 having the maximum width W1 passes.

A temperature equalization member 7B, which is the remaining one of the temperature equalization members 7, has a length L2 less than that of the temperature equalization member 7A.

The length of each temperature equalization member 7 is the length in the longitudinal direction of the temperature equalization member 7. The length may be the length of an effective portion of the temperature equalization member 7 that contributes to equalization of the temperature, or the distance between both ends of the outer shape in the longitudinal direction when the effective portion is unknown.

In the first exemplary embodiment, a heat pipe 71 is used as the temperature equalization member 7A, and a heat pipe 72 is used as the temperature equalization member 7B.

Each of the heat pipes 71 and 72 includes a body and volatile working fluid (for example, pure water) enclosed in the body, the body being composed of a sealed pipe having a cylindrical shape with closed ends and made of a material with a high thermal conductivity, such as copper or stainless steel, and including an inner wall having a capillary structure (wick).

The heat pipe 71 has the length L1 greater than or equal to the width of the maximum passing region E1 of the heater 54. The length L1 of the heat pipe 71 according to the first exemplary embodiment is greater than the width of the maximum passing region E1 (L1>E1).

As illustrated in FIG. 5, the heat pipe 71 is disposed closer to the second heating portion 543 of the heater 54 than the heat pipe 72.

In addition, as illustrated in FIG. 5, the heat pipe 71 is disposed to overlap the maximum passing region E1 of the heater 54. In other words, the heat pipe 71 is disposed such that one end portion 71*b* and the other end portion 71*c* thereof are both positioned outside respective ends of the maximum passing region E1.

The heat pipe 72 may have any length that is less than that of the heat pipe 71, and therefore the length L2 of the heat pipe 72 may be any length that is at least less than the width of the maximum passing region E1 of the heater 54 (L2<E1).

The length L2 of the heat pipe 72 according to the first exemplary embodiment is less than or equal to the width of the region E4, which is a portion of the maximum passing region E1 of the heater 54 excluding the non-passing regions E2 and E3, and is less than the width of the region E4 in practice.

As illustrated in FIG. 5, the heat pipe 72 is disposed closer to the first heating portion 542 of the heater 54 than the heat pipe 71.

In addition, as illustrated in FIG. 5, the heat pipe 72 is disposed so as not to extend into the non-passing regions E2 and E3 in the maximum passing region E1. In other words, the heat pipe 72 is disposed such that one end portion 72*b* and the other end portion 72*c* thereof are both disposed in the region E4 other than the non-passing regions E2 and E3 in the maximum passing region E1.

The heat pipes 71 and 72 extend along the back surface 541*b* of the substrate 541 of the heater 54 in the longitudinal direction (direction along the width direction D of the paper sheet 9), and are disposed parallel to each other with a predetermined interval therebetween in the transport direction C of the paper sheet 9.

The two heat pipes 71 and 72 are disposed parallel to each other when used, and therefore have a relatively small diameter (for example, an outer diameter of several millimeters).

The manner in which the heat pipes 71 and 72 are attached to the heating unit 55 will now be described.

As illustrated in FIGS. 4A and 4B, the heat pipes 71 and 72 are respectively placed in attachment grooves 65A and 65B provided in the receiving recess 61*a* in the contact holder 61. After that, the heater 54 is fitted to in the receiving recess 61*a*. Thus, the heat pipes 71 and 72 are attached by being pressed by the back surface 541*b* of the heater 54.

At this time, the heat pipes 71 and 72 may be partially bonded to the back surface 541*b* of the heater 54 with a thermally conductive adhesive.

Referring to, for example, FIG. 3, the heating unit 55 is fixed by attaching both end portions 63*d* and 63*e* of the support 63 in the longitudinal direction to attachment portions (not illustrated) provided on inner wall surfaces of the housing 50 of the heating device 5. Thus, the heating unit 55 is attached to the heating device 5.

The pressing roller 56, which serves as the pressing rotating body 52, is obtained by, for example, forming an elastic layer, a release layer, etc., on an outer peripheral surface of a solid or hollow cylindrical roller body made of, for example, a metal.

Referring to FIG. 3, the pressing roller 56 has shaft portions 56*c* and 56*d* at both ends in an axial direction thereof, and the shaft portions 56*c* and 56*d* are rotatably supported by a pressing mechanism (not illustrated) disposed on the housing 50. The pressing roller 56 receives pressure from the pressing mechanism, and is thereby pressed against the heating unit 55.

Accordingly, as illustrated in FIGS. 2 and 3, the pressing roller 56 is retained such that an outer peripheral surface thereof is pressed against the one surface 541*a* of the heater 54 at a predetermined pressure along the longitudinal direction with the heating belt 53 of the heating unit 55 interposed therebetween.

A section in which the pressing roller 56 is pressed against the heating unit 55 with the heating belt 53 interposed therebetween serves as the above-described contact section FN.

As illustrated in FIG. 3, a power receiving gear 59, which is an example of a drive input unit, is attached to one shaft portion 56*c* of the pressing roller 56. The power receiving gear 59 meshes with a power receiving gear (not illustrated) of a driving-force transmitting device 15 disposed in the housing 10 of the image forming apparatus 1.

Thus, when, for example, the image forming operation is to be carried out, the pressing roller 56 receives rotational power transmitted from the driving-force transmitting device 15, and is thereby driven to rotate at a predetermined speed in the direction shown by arrow B1, as illustrated in FIG. 2.

When the pressing roller 56 is driven to rotate, as illustrated in FIG. 2, the heating belt 53 of the heating unit 55 is rotated in the direction shown by arrow B2.

Heating Operation of Heating Device

When the heating device 5 is energized or used, power is supplied to both the first heating portion 542 and the second heating portion 543 of the heater 54.

Thus, the heating device 5 starts a start-up heating operation of causing the first heating portion 542 and the second heating portion 543 to generate heat until the temperature of the heater 54 reaches a preset temperature over the maximum passing region E1 in the width direction D.

When the heating device 5 performs a heating process during the image forming operation, the region in which the heater 54 of the heating unit 55 is caused to generate heat is adjusted in accordance with the width W of the paper sheet 9 that passes through the contact section FN. In the first exemplary embodiment, the heating process is performed in the fixing operation.

When, for example, the width W of the paper sheet 9 that is transported is the maximum width W1, power is supplied to both the first heating portion 542 and the second heating portion 543 of the heater 54, so that the heater 54 generates heat in the maximum passing region E1 corresponding to the maximum width W1 of the paper sheet 9. Thus, in the heating device 5, a portion of the heating belt 53 corresponding to the maximum passing region E1 is heated by the heater 54, and the paper sheet 9 having the maximum width W1 is heated accordingly.

When the paper sheet 9 that is transported has the smaller width W2 that is often used, power is supplied only to the second heating portion 543 of the heater 54, so that the heater 54 generates heat in a region corresponding to the width W2 of the paper sheet 9 (region E4 excluding the non-passing regions E2 and E3). Thus, in the heating device 5, a portion of the heating belt 53 corresponding to the region E4 excluding the non-passing regions E2 and E3 is heated by the heater 54, and the paper sheet 9 having the width W2 is heated accordingly.

When the paper sheet 9 that is transported has the width W2, only the second heating portion 543 of the heater 54 receives power to generate heat, and the second heating portion 543 generates a certain amount of heat also in the sections 543*b* of the second heating portion 543 corresponding to the non-passing regions E2 and E3.

Thus, the heating device 5 performs the heating process by causing the heater 54 of the heating unit 55 to efficiently generate heat in accordance with the width W of the paper sheet 9.

Unnecessary Temperature Increase in Non-Passing Regions

When, for example, plural paper sheets 9 having the width W2 less than the maximum width W1 are successively transported and heated by the heating device 5, the contact section FN includes the non-passing regions E2 and E3 through which the paper sheets 9 do not pass. Therefore, in the non-passing regions E2 and E3 of the heater 54 included in the contact section FN, heat is not removed by the paper sheets 9 that are transported, but heating is continuously performed by the sections 543*b* of the second heating portion 543 in which heat generation is reduced, and therefore an unnecessary temperature increase may occur.

In the heating device 5, the heat pipe 71 disposed in the maximum passing region E1 including the non-passing regions E2 and E3 transfers heat so that heat due to the temperature increase in the non-passing regions E2 and E3 of the heater 54 is transferred to the region of the heater 54 through which the paper sheets 9 pass (region E4 excluding the non-passing regions E2 and E3). More specifically, the temperature in the region of the heater 54 through which the paper sheets 9 pass is temporarily reduced to a temperature below that in the non-passing regions E2 and E3 due to removal of heat by the paper sheets 9, and accordingly the heat pipe 71 transfers heat from the non-passing regions E2 and E3.

Accordingly, in the heating device 5, the temperature increase in the non-passing regions E2 and E3 may be less than that in the case where no temperature equalization member is disposed. In addition, in the heating device 5, since the heat pipe 71 is disposed close to the second heating portion 543, the temperature increase in the non-passing regions E2 and E3 may be easily reduced.

Thus, the temperature of the heater 54 may be equalized in the width direction D of the maximum passing region E1 due to, for example, the heat pipe 71.

Time Required for Start-Up Heating of Heater

When the heating device 5 is energized or caused to restart the heating operation and when start-up heating of the heater 54 is performed, the time required for the start-up heating is less than that in the case where plural temperature equalization members 7A having a length greater than or equal to the width of the maximum passing region E1 of the heater 54 are arranged to overlap the maximum passing region E1.

This is presumably due to the fact that instead of providing two heat pipes 71 having the length greater than or equal to the width of the maximum passing region E1, one of the heat pipes 71 is replaced by the heat pipe 72 having a length less than that of the heat pipes 71, and accordingly the heat capacity of the heat pipe 72 disposed in contact with the heater 54 is reduced.

Comparison Test

The heating device 5 according to the first exemplary embodiment (Example 1) and heating devices according to Comparative Examples 1 and 2 described below were tested for comparison. In the comparison test, temperature variation in the non-passing regions E2 and E3 of the heater 54 (contact section FN) of each heating device and time required for start-up heating of the heater 54 of each heating device were determined.

Figure 7A:
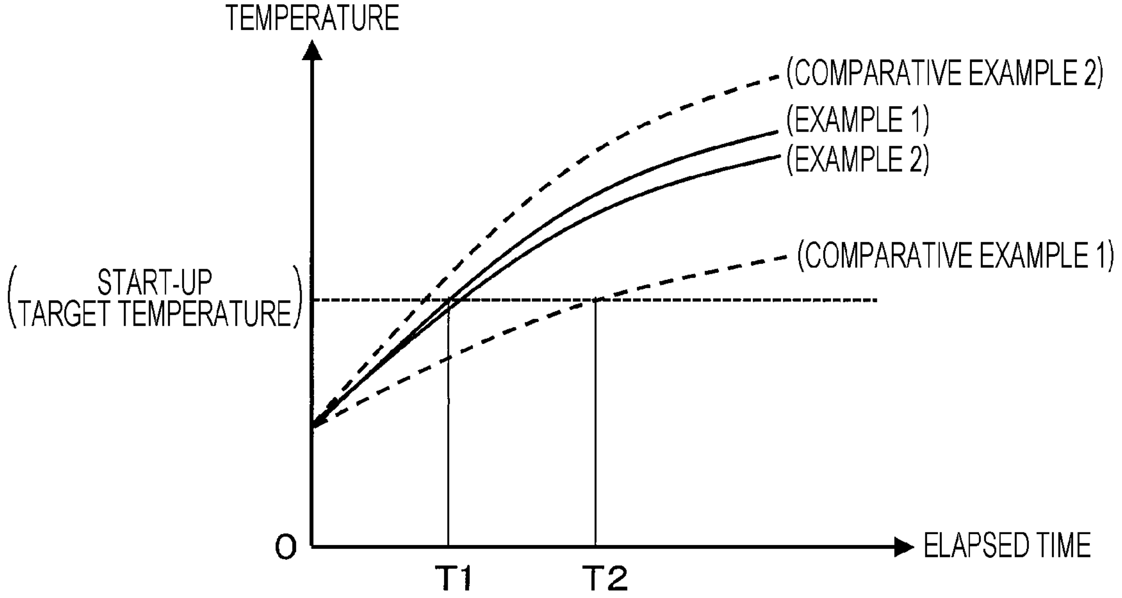
FIG. 7A is a graph showing the results of a comparison test regarding time required for start-up heating of the heater.
Figure 7B:
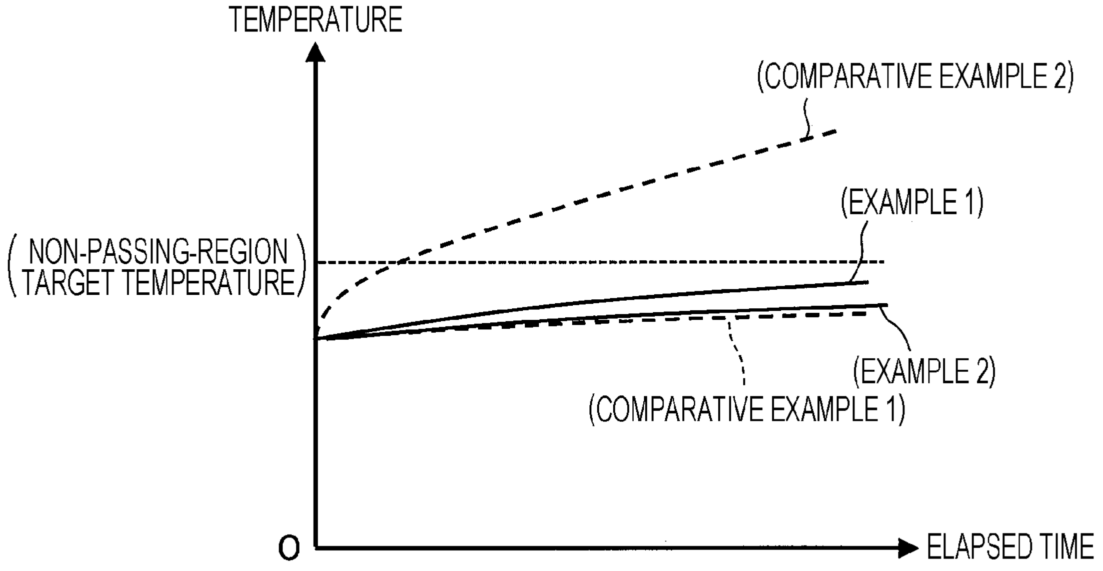
FIG. 7B is a graph showing the results of a comparison test regarding temperature increase in non-passing regions.

FIGS. 7A and 7B show simplified results of the comparison test.

Figure 9A:
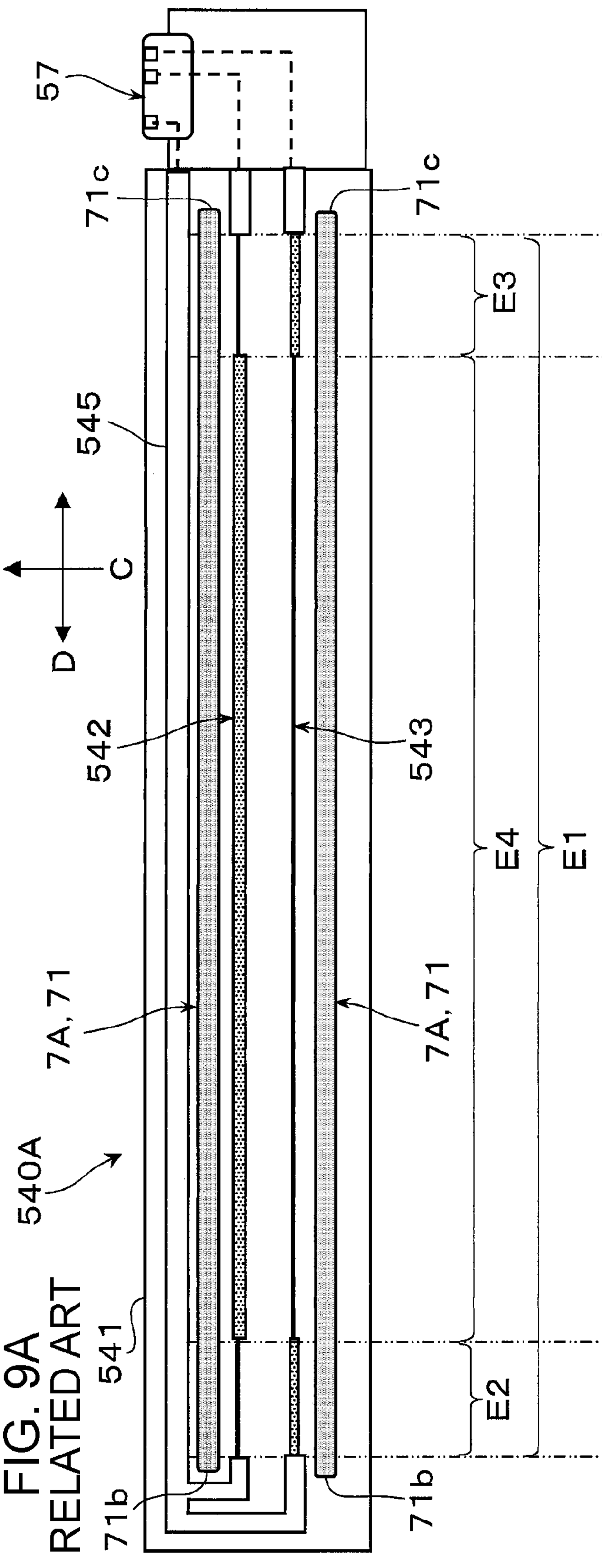
FIG. 9A RELATED ART
FIG. 9A is a schematic diagram of a heater included in a heating device according to Comparative Example 1.

The heating device according to Comparative Example 1 includes a heater 540A illustrated in FIG. 9A.

The heater 540A is structured such that the heat pipe 71 serving as the temperature equalization member 7A having a length greater than or equal to the width of the maximum passing region E1 is disposed close to the first heating portion 542 in place of the heat pipe 72 serving as the temperature equalization member 7B and disposed on the heater 54 according to the first exemplary embodiment. The two heat pipes 71 and 71 of the heater 540A are both disposed to overlap the maximum passing region E1.

Figure 9B:
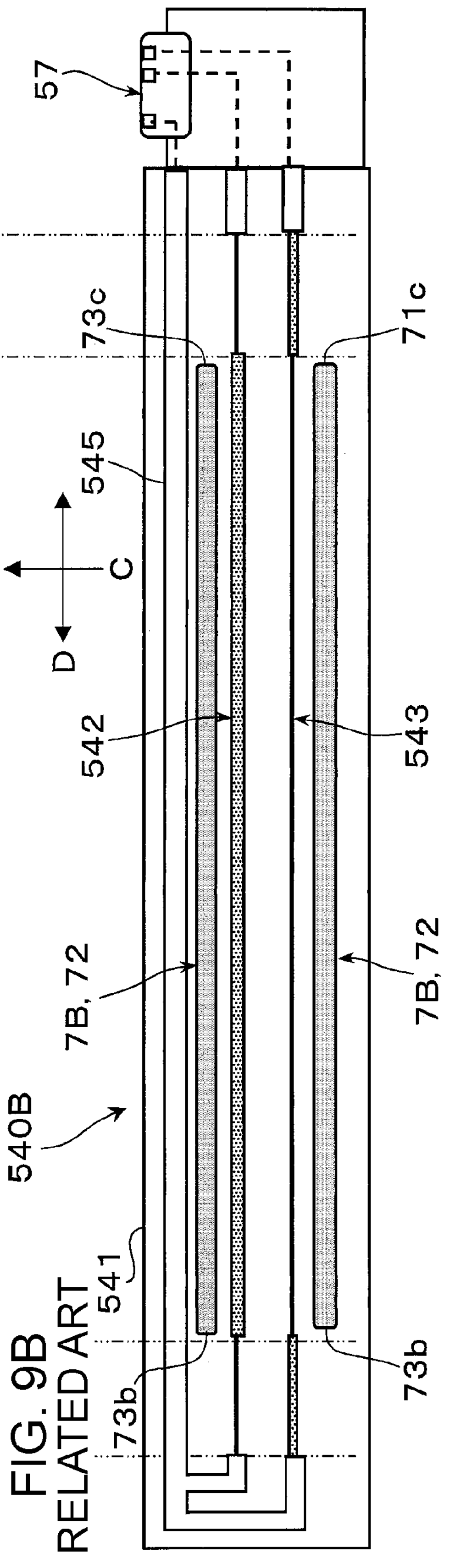
FIG. 9B RELATED ART
FIG. 9B is a schematic diagram of a heater included in a heating device according to Comparative Example 2.

The heating device according to Comparative Example 2 includes a heater 540B illustrated in FIG. 9B.

The heater 540B is structured such that the heat pipe 72 serving as the temperature equalization member 7B having a length less than the width of the maximum passing region E1 and slightly less than the width of the region E4 excluding the non-passing regions E2 and E3 is disposed close to the second heating portion 543 in place of the heat pipe 71 serving as the temperature equalization member 7A and disposed on the heater 54 according to the first exemplary embodiment. The two heat pipes 72 and 72 of the heater 540B are both disposed so as not to extend into the non-passing regions E2 and E3 in the maximum passing region E1.

According to the results shown in FIG. 7A, a time T1 required by the heating device 5 according to Example 1 to increase the temperature to a target temperature in start-up heating of the heater 54 is slightly longer than a time required by the heating device according to Comparative Example 2, but is shorter than a time T2 required by the heating device according to Comparative Example 1 (T2>T1). This shows that, according to the heating device 5 of Example 1, the time required to reach the target temperature in start-up heating of the heater 54 may be reduced compared to the time required by the heating device according to Comparative Example 1.

According to the results shown in FIG. 7B, a reduction in the temperature increase in the non-passing regions E2 and E3 achieved by the heating device 5 according to Example 1 is slightly less than a reduction in the temperature increase achieved by the heating device according to Comparative Example 1, but is enough to maintain the temperature less than or equal to a target temperature in the non-passing regions, unlike the temperature in the heating device according to Comparative Example 2. This shows that, according to the heating device 5 of Example 1, the unnecessary temperature increase in the non-passing regions E2 and E3 of the heater 54 may be reduced compared to that in Comparative Example 2.

Second Exemplary Embodiment

Figure 8:
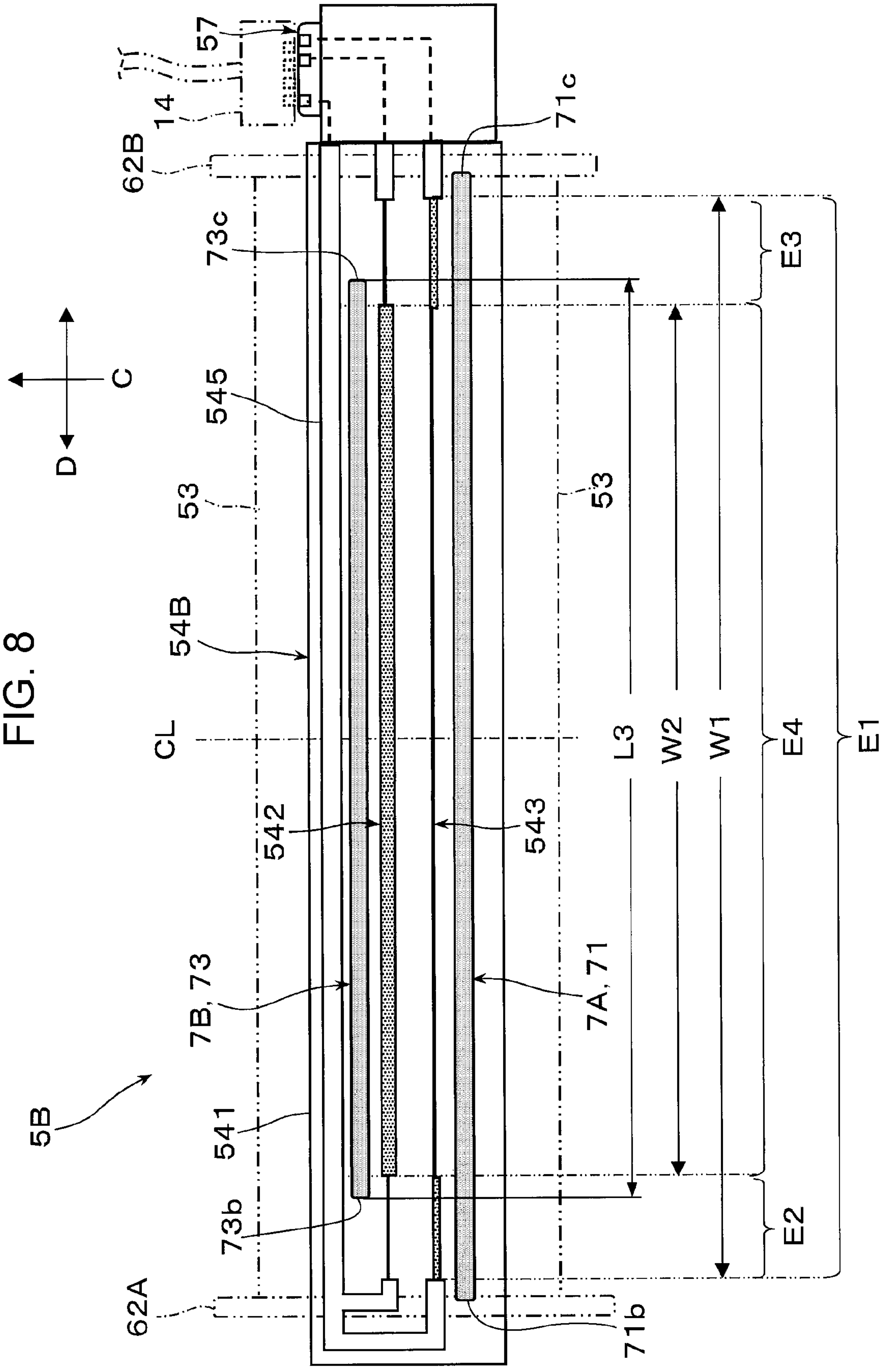
FIG. 8 is a schematic diagram of a part of a heating unit included in a heating device according to a second exemplary embodiment.

FIG. 8 illustrates a part (basically a heater) of a heating device 5B according to a second exemplary embodiment of the present disclosure.

The heating device 5B according to the second exemplary embodiment has the same structure as that of the heating device 5 according to the first exemplary embodiment except that the heating device 5B includes a heater 54B in which a heat pipe 73 having a length different from that of the heat pipe 72 is used in place of the heat pipe 72 serving as the temperature equalization member 7B in the heater 54 according to the first exemplary embodiment.

In the following description and FIG. 8, components that are the same as those of the heater 54 according to the first exemplary embodiment are denoted by the same reference numerals, and description thereof will be omitted unless necessary.

As illustrated in FIG. 8, the heater 54B of the heating device 5B includes the heat pipe 73, which serves as the temperature equalization member 7B, in addition to the heat pipe 71, which serves as the temperature equalization member 7A.

As illustrated in FIG. 8, the heat pipe 73 has a length L3 that is less than the width of the maximum passing region E1 but is greater than the width of the region E4, which is a portion of the maximum passing region E1 excluding the non-passing regions E2 and E3.

Similarly to the heat pipe 72 of the first exemplary embodiment, the heat pipe 73 is disposed closer to the first heating portion 542 of the heater 54B than the heat pipe 71.

The heat pipe 73 is disposed to extend into the non-passing regions E2 and E3 in the maximum passing region E1. In other words, the heat pipe 73 is disposed such that one end portion 73*b* and the other end portion 73*c* thereof both extend into the non-passing regions E2 and E3 from the region E4 other than the non-passing regions E2 and E3.

In this case, the length by which the heat pipe 73 projects into the non-passing regions E2 and E3 may, for example, be less than or equal to one-half of the width of the non-passing regions E2 and E3 to facilitate reduction in the time required for start-up heating.

The heating device 5B according to the second exemplary embodiment performs a heating operation similar to that performed by the heating device 5 according to the first exemplary embodiment.

Similarly to the above-described comparison test, the heating device 5B according to the second exemplary embodiment (Example 2) was also used to determine the temperature variation in the non-passing regions E2 and E3 of the heater 54B and the time required for start-up heating of the heater 54B. The results of Example 2 are also shown in FIGS. 7A and 7B.

According to the heating device 5B, substantially similarly to the heating device 5 according to the first exemplary embodiment, the unnecessary temperature increase in the non-passing regions E2 and E3 in the maximum passing region E1 during the heating process and the time required for start-up heating of the heater 54B may be reduced compared to those in a case where plural temperature equalization members 7A having lengths greater than or equal to the width of the maximum passing region E1 of the heater 54 are disposed to overlap the maximum passing region E1.

In particular, the heating device 5B is capable of more easily reducing the unnecessary temperature increase in the non-passing regions E2 and E3 than the heating device 5 according to the first exemplary embodiment.

Modifications

The present disclosure is not limited to the structures illustrated in the above-described exemplary embodiments, and alterations and combinations are possible within the gist of the disclosure described in the claims. The present disclosure includes modifications described below.

Each of the heaters 54 and 54B may include three or more heating portions. When three or more heating portions are provided, one of the heating portions is structured as the first heating portion in which sections thereof corresponding to the non-passing regions E2 and E3 in the maximum passing region E1 generate a relatively large amount of heat. Another one of the heating portions is structured as the second heating portion in which a section thereof corresponding to the region E4, which is a portion of the maximum passing region E1 excluding the non-passing regions E2 and E3, generates a relatively large amount of heat.

One or more heating portions other than the above-described two heating portions may each be a third heating portion in which a section thereof that generates a relatively large amount of heat is narrower than that of the second heating portion, or a fourth heating portion in which a section thereof that generates a relatively large amount of heat is wider than that of the second heating portion.

When each of the heaters 54 and 54B includes three or more heating portions, the number of temperature equalization members 7 may be two, but may also be three or more.

When three or more temperature equalization members 7 are provided, one of the temperature equalization members 7 may be the temperature equalization member 7A having a length greater than or equal to the width of the maximum passing region E1, and another one of the temperature equalization members may be the temperature equalization member 7B having a length less than that of the temperature equalization member 7A. Also in this case, the temperature equalization member 7A is disposed at a position close to the second heating portion.

Also in this case, plural temperature equalization members 7A may be used. When plural temperature equalization members 7A are used, the number thereof may be less than the number of temperature equalization members 7B.

Each temperature equalization member 7 may be, for example, a vapor chamber, a graphite sheet, or a copper material instead of a heat pipe.

The shape of the heat pipes 71, 72, and 73 is not limited to a cylindrical shape, and the heat pipes 71, 72, and 73 may be, for example, flat plate-shaped.

Although each of the heating devices 5 and 5B according to the first and second exemplary embodiments is structured such that the heating unit 55, which is an example of the heating rotating body 51, and the pressing roller 56, which is an example of the pressing rotating body 52, are arranged horizontally next to each other and rotate in contact with each other, the structure is not limited to this.

For example, the heating device 5 may be structured such that the heating unit 55 and the pressing roller 56 are arranged on top of each other in a substantially vertical direction (direction of gravity) and rotate in contact with each other, or such that the heating unit 55 and the pressing roller 56 are arranged on top of each other in an oblique direction and rotate in contact with each other.

The pressing rotating body 52 is not limited to a roller-shaped component, and may have, for example, a belt-nip structure. The drive input unit for the pressing rotating body 52 is not limited to the power receiving gear 59, and other types of units may be used.

Although each of the heating devices 5 and 5B is a heating-pressing device including the pressing rotating body 52, the pressing rotating body 52 may be omitted as long as the heating object may be brought into contact with a heating section of the heating unit 55 and heated.

The heating object heated by the heating devices 5 and 5B is not limited to the paper sheet 9.

According to the heating unit 55, the heating belt 53 may also be regarded as an example or a portion of the heating object. The heating unit 55 may be structured such that the heating belt 53 is not provided.

Although the heating device 5 is applied to the image forming apparatus 1 in the first and second exemplary embodiments, the heating device 5 is not limited to this.

The heating device 5 may also be applied to, for example, another type of image forming apparatus, a paper-sheet drying apparatus (example of a heating-object utilization apparatus) that heats or dries the paper sheet 9 transported by a paper-sheet transport unit, or an apparatus that performs a process of heating or drying a sheet-shaped object (example of a heating object) having no image formed thereon while transporting the sheet-shaped object with a transport unit.

The image forming apparatus 1 may be an apparatus that forms a multi-color image by using toners of plural colors, and the type thereof is not particularly limited.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A heating device comprising:

a heater including a plurality of heating portions that generate different amounts of heat in a width direction that crosses a transport direction in which a heating object is transported; and a plurality of temperature equalization members that are disposed on the heater and extend in the width direction with an interval provided therebetween in the transport direction, the plurality of temperature equalization members equalizing a temperature of the heater in the width direction, wherein one of the plurality of temperature equalization members has a length greater than or equal to a width of a maximum passing region of the heater through which the heating object passes when the heating object has a maximum width, and wherein a remaining one of the plurality of temperature equalization members has a length less than the length of the one of the plurality of temperature equalization members.

2. The heating device according to claim 1, wherein one of the plurality of heating portions is a first heating portion that generates a relatively large amount of heat in a section corresponding to a non-passing region that is a portion of the maximum passing region through which the heating object does not pass in a heating process, and wherein the remaining one of the plurality of temperature equalization members is disposed closer to the first heating portion than the one of the plurality of temperature equalization members.

3. The heating device according to claim 2, wherein the remaining one of the plurality of temperature equalization members has a length less than or equal to a width of a region that is a portion of the maximum passing region excluding the non-passing region.

4. A heating-object utilization apparatus comprising:

a transport unit that transports a heating object; and a heating device that heats the heating object transported by the transport unit, wherein the heating device is constituted by the heating device according to claim 3.

5. The heating device according to claim 2, wherein the remaining one of the plurality of temperature equalization members is disposed so as not to extend into the non-passing region in the maximum passing region.

6. A heating-object utilization apparatus comprising:

a transport unit that transports a heating object; and a heating device that heats the heating object transported by the transport unit, wherein the heating device is constituted by the heating device according to claim 5.

7. The heating device according to claim 2, wherein the remaining one of the plurality of temperature equalization members has a length greater than a width of a region that is a portion of the maximum passing region excluding the non-passing region.

8. A heating-object utilization apparatus comprising:

a transport unit that transports a heating object; and a heating device that heats the heating object transported by the transport unit, wherein the heating device is constituted by the heating device according to claim 7.

9. The heating device according to claim 2, wherein the remaining one of the plurality of temperature equalization members is disposed to extend into the non-passing region in the maximum passing region.

10. A heating-object utilization apparatus comprising:

a transport unit that transports a heating object; and a heating device that heats the heating object transported by the transport unit, wherein the heating device is constituted by the heating device according to claim 9.

11. A heating-object utilization apparatus comprising:

a transport unit that transports a heating object; and a heating device that heats the heating object transported by the transport unit, wherein the heating device is constituted by the heating device according to claim 2.

12. The heating device according to claim 1, wherein one of the plurality of heating portions generates a relatively large amount of heat in a section excluding a section corresponding to a non-passing region that is a portion of the maximum passing region through which the heating object does not pass in a heating process, and wherein the one of the plurality of temperature equalization members is disposed closer to the heating portion that generates the relatively large amount of heat than the remaining ones of the plurality of temperature equalization members.

13. A heating-object utilization apparatus comprising:

a transport unit that transports a heating object; and a heating device that heats the heating object transported by the transport unit, wherein the heating device is constituted by the heating device according to claim 12.

14. A heating-object utilization apparatus comprising:
a transport unit that transports a heating object; and
a heating device that heats the heating object transported by the transport unit,
wherein the heating device is constituted by the heating device according to claim 1.

* * * * *